United States Patent [19]

Penn

[11] 4,315,170
[45] Feb. 9, 1982

[54] REVERSIBLE ELECTRIC MOTOR

[76] Inventor: Silas Penn, 5316 Sheridan, Detroit, Mich. 48213

[21] Appl. No.: 166,494

[22] Filed: Jul. 7, 1980

[51] Int. Cl.³ .......................................... H02K 33/10
[52] U.S. Cl. .................................................... 310/39
[58] Field of Search ...................... 310/39, 27, 36–39; 318/133, 134

[56] References Cited

U.S. PATENT DOCUMENTS 3,341,689 9/1967 Reichenbach ................... 310/39 X

Primary Examiner—Donovan F. Duggan
Attorney, Agent, or Firm—Hauke and Patalidis

[57] ABSTRACT

An electric motor having an output shaft that rotatably oscillates automatically, the motor comprising a pair of reversing terminals, a reversing switching mechanism for connecting the first reversing terminal to a plus terminal connected to a source of electric power while disconnecting the second reversing terminal from the plus terminal and for connecting the second reversing terminal to the plus terminal while disconnecting the first reversing terminal from the plus terminal, a cam on the output shaft for actuating the reversing switch, and for co-operating with a pair of abutments on the switch limiting the rotation of the output shaft in one direction and in the other, and a spring bias detent for maintaining one of the reversing terminals in connection with the plus terminal until disengaged by the cam.

3 Claims, 6 Drawing Figures

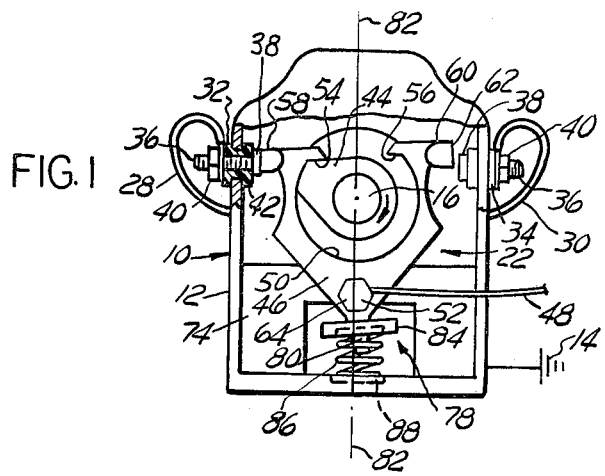
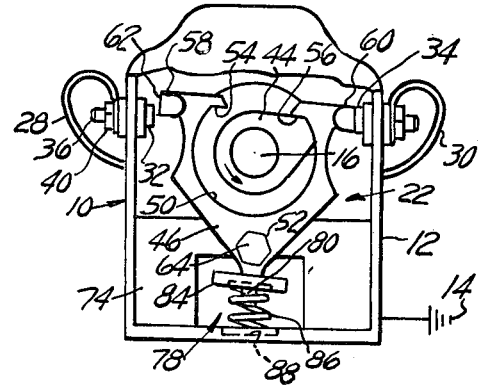
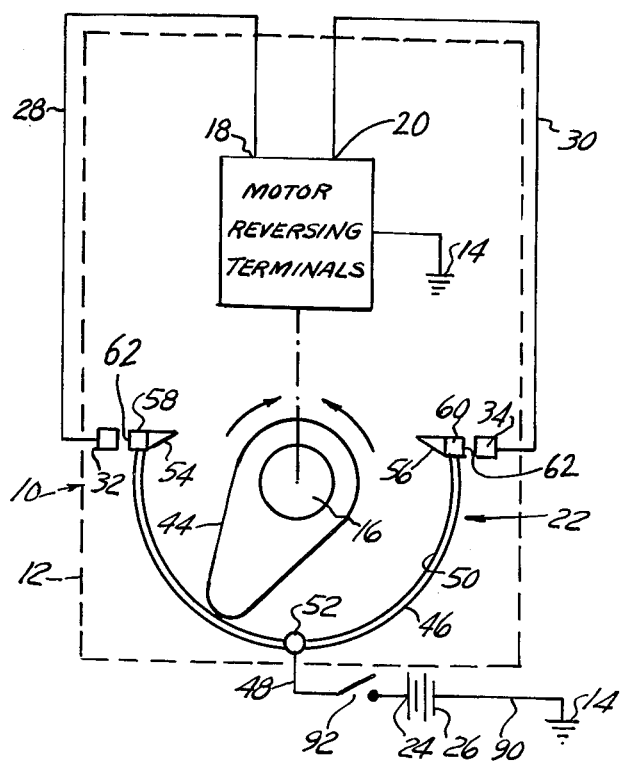
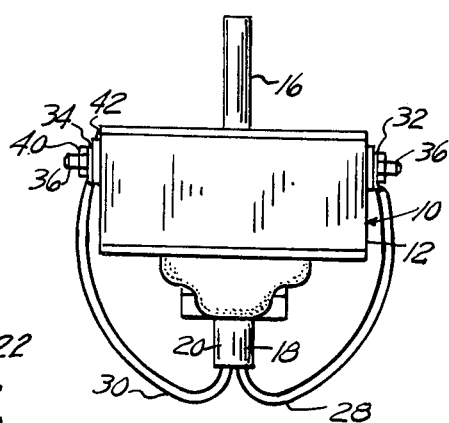
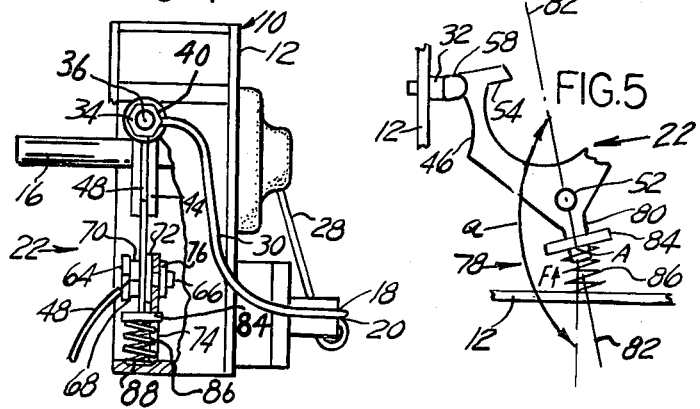

REVERSIBLE ELECTRIC MOTOR

BACKGROUND OF THE INVENTION

The present invention relates to an electric motor having a rotatably oscillating output shaft, for example for operating a windshield wiper on a motor vehicle, or on a watercraft.

Electric motors are generally built so that the direction of rotation of their output shafts can be reversed by reversing the flow of current through the windings. This requires disconnecting and reconnecting the power source across the motor input terminals, or connecting the motor input terminals to the power source output terminals through a reversing switch. Such arrangements, however, do not provide an adequate means for reversing the direction of rotation of an electric motor output shaft in a rapid and regular sequence such as that needed to operate a device like a windshield wiper on a motor vehicle. Consequently, in mass production, DC electric motors having rotatably oscillating drive shafts must be manufactured in two distinct assembled components. The first component is the motor itself having an output shaft that is intended to rotate continuously in one direction. The second component is a pivot arm and drive shaft assembly which consists of a series of gears and drive arms linking the output shaft of the motor to a rotatably oscillating drive shaft.

SUMMARY OF THE INVENTION

The present invention overcomes the disadvantages of the prior art by incorporating into a single conventional electric motor unit a unique combination of components causing the output shaft of an electric motor to rotatably oscillate automatically by means of a reversing control comprising a cam affixed to the shaft and operating a reversing switch. When the output shaft rotates in one direction the cam engages the switch with one of the pair of reversing terminals. The cam is then stopped from continuing rotation by one of a pair of abutments. The engaged reversing terminal reverses the current to the windings and causes the output shaft to rotate in the other direction. A spring bias detent attached to the switch maintains the switch and the engaged reversing terminal in engagement until disengaged by the cam. As the output shaft continues to rotate, it disengages the switch from the first reversing terminal and then engages it with the other or second reversing terminal. The cam is then stopped for rotating by the other abutment and reverses its rotation again.

An advantage of the present invention is that automatic reversing means are comprised within a single conventional electric motor unit.

Another advantage of the present invention is that the output shaft reverses rotational direction itself in a rapid and regular sequence in the manner needed to drive a device such as a motor vehicle windshield wiper.

Another advantage of the present invention is that a separate pivot arm and drive shaft assembly is not necessary to link the output shaft to a separate drive shaft for the reason that the latter drive shaft is not required to obtain rapid sequential rotational oscillation.

These and other objects and advantages of the present invention will become apparent to those skilled in the art when the following description of the best mode contemplated for practicing the invention is read in conjunction with the accompanying drawing wherein like reference numerals refer to like or equivalent parts, and in which:

BRIEF DESCRIPTION OF THE DRAWING

FIG. 1 is a front elevation view of a conventional reversible DC electric motor with the front cover plate broken away to expose an automatic reversing mechanism according to the invention and showing the reversing mechanism in one extreme position;

FIG. 2 is a view substantially similar to FIG. 1 with some portions omitted and showing the reversing mechanism in its other extreme position;

FIG. 3 is a top plan view of the structure of FIG. 1;

FIG. 4 is a side elevation view of the structure of FIG. 1 with the side of the housing broken away to expose the reversing mechanism according to the invention;

FIG. 5 is an enlarged schematic view substantially similar to FIG. 2 with further portions omitted, showing the arrangement for holding the reversing mechanism in its extreme position; and FIG. 6 is a simplified electrical diagram of the general arrangement according to the invention.

DETAILED DESCRIPTION OF THE PREFERRED EMBODIMENTS

The principle of the present invention is applicable to all electric motors. However, for the sake of simplifying the description of structures incorporating the principle of the invention, the present invention will be described as adapted to a DC electric motor used, for example, for operating a motor vehicle windshield wiper.

Referring to the drawing, and more particularly to FIGS. 1-4 and 6, there is shown a typical motor in accordance with the invention. The preferred embodiment illustrated comprises a reversible DC electric motor 10 having a housing 12, preferably made of electrically conductive material, that is connected to a ground 14, a reversible output shaft 16, a pair of reversing input terminals 18 and 20, a reversing switching mechanism 22 for connecting the first reversing terminal to an output terminal 24 of a source of electric power 26 FIG. 6, while disconnecting the second reversing terminal from the output terminal 24 and for connecting the second reversing terminal to the output terminal 24 while disconnecting the first reversing terminal from the output terminal 24. The direction of rotation of the shaft 16 is dictated by which one of the reversing terminals 18 or 20 is connected to the output terminal 24.

Each reversing terminal 18 or 20 is connected by a wire 28 or 30 to one of a pair of stationary contacts 32 or 34, one on each side the housing 12. Each contact 32 and 34 comprises a stud 36, preferably peripherally threaded, extending through a hole in the side of the housing 12 and forming into an enlarged head 38 disposed inside the housing and having a nut 40 or other means on the outside of the housing for attaching or connecting the reversing terminal 18 or 20 to the other end of the stud portion of the stationary contact 32 or 34. It is readily apparent that the wire 28 and 30 may be disposed inside the motor housing 12 or outside the housing as shown in the drawing. FIG. 1 shows a cross-section view of the stationary contact 32 having insulation 43 for insulating the contact from the conductive housing 12 to prevent short circuiting.

The reversing switching mechanism 22 comprises a single lobe cam 44 attached around the output shaft 16 by a set screw, not shown, or other means, a movable single pole double throw reversing switch 46 connected to the output terminal 24 by a wire 48, the reversing switch 46 being a conductive pivotal generally flat U-shaped member disposed around the output shaft 16 and having a partial ring or annular-like inner surface 50 engageable by the cam 44 for oscillating the reversing switch member 46 about its pivot 52. The two ends of the partial annular inner surface form a pair of abutments 54 and 56 that are integral with the switch member 46 and which extend inwardly toward the output shaft 16 relative to the cam 44 for limiting the rotation of the cam and of the output shaft in one direction and in the other. A pair of contact surfaces 58 and 60 are affixed each on one side of the U-shaped switch member 46 and each have an enlarged head 62 for engagement with one of the stationary contacts 32 or 34.

The pivot 52 comprises an enlarged head 64 integral with a stud 66, preferably threaded, FIG. 4, extending through an eyelet 68 to which the output terminal wire 48 is connected, and further extending through a nut 70, the reversing switch 46, a washer 72 and it is attached to an insulated switch support plate 74 by a nut 76 or other appropriate means.

A spring bias detent 78, FIG. 5, is incorporated into the reversing switching mechanism 22 for maintaining the movable switch 46 and one of the pair of stationary contacts 32 or 34 in engagement until disengaged by the cam 44. The spring bias 78, as shown in the drawing, comprises an arm-like portion 80 of the switch 46, the arm 80 coinciding with an imaginary line 82, FIGS. 1 and 5, extending vertically through the axis of the annular surface 50, and extending downwardly through a washer 84 to which it is attached. A spring 86 is disposed between the washer 84 and the base of the motor housing 12 and it is held in place by recesses 88 in the washer and housing, FIG. 2.

To illustrate how the spring bias detent 78 works, when the U-shaped contact switch 46 is straight up and down, engaged with neither of the stationary contacts 32 or 34, its imaginary line 82 and its arm 80 both extend vertically through the axis of the spring 86. In actual operation, however, the U-shaped switch only assumes this position transitionally when the cam 44 has disengaged it from one of the stationary contacts 32 or 34 and is directing it toward the other stationary contact for engagement. Referring to FIG. 5, the imaginary vertical line 82 and the arm 80 are at an angle a to the axis of the spring 86 when the U-shaped switch 46 is engaged with one of the stationary contacts 32 or 34 and the spring 86 exerts force F at the apex A of the angle a against the arm 80 thus holding the U-shaped switch in engagement with one of the stationary contacts. In other words, the spring bias 78 and the switch 46 are a lever in the first order; the integral arm 80 and the U-shaped portion of the switch 46 are a rod, the movable contacts 58-60 are a load, the pivot 52 is a fulcrum, and the spring 86 is a force. The force exerted by the spring 86 is transmitted to one or the other of the pair of movable contacts 58 or 60 through the arm 80 and the U-shaped portion of the switch 46. The direction of force upon the arm is dictated by the position the switch 46 is put in by the cam 44, FIGS. 1-2.

Referring to FIG. 6, there is shown a simplified electrical diagram of the general arrangement according to the invention. The source of electric power 26 has a terminal 90 connected to the ground 14 and the positive output terminal 24 connected to a single pole single throw on-off switch 92 to the single pole double throw reversing switch 46 proximate its pivot 52.

When the on-off switch 92 is closed or in the on position the output shaft 16 rotates, for example, in a clockwise direction, FIG. 1, and the movable contact surface 58 of the reversing switch 46 is actuated by the oscillating cam 44 to engage with the stationary contact 32 while the movable contact surface 60 is being disengaged from the stationary contact 34, FIG. 1. The stationary contact 32 is connected to the reversing terminal 18 by the wire 28. The reversing terminal 18, being connected to the windings, not shown, causes the flow of electrical current to reverse its direction through the windings and then the current is directed to the common ground 14 of the housing 12 and back to the source of electric power 26. The oscillating cam 44 is then stopped by the abutment 54, and the output shaft reverses its direction of rotation, FIG. 2, directing the cam to engage the movable contact surface 60 of the reversing switch 46 to the stationary contact 34 while disengaging the movable contact surface 58 from the stationary contact 32, FIG. 2, the stationary contact 34 being connected to the reversing terminal 20 by the wire 30. The reversing terminal 20, connected to the windings, not shown, causes the flow of electrical current to reverse through the windings once again, thus causing the output shaft to reverse its direction of rotation, FIG. 2, after it has been stopped by the cam hitting the abutment 56.

The operational result of the arrangement of the invention is to rotatably oscillate the output shaft of a motor automatically and in rapid sequence such as to drive, for example, a windshield wiper on a motor vehicle by the switching means hereinbefore described and incorporated into the motor of the invention.

Having thus described the present invention by way of examples of structural embodiments thereof, modifications whereof will be apparent to those skilled in the art, what is claimed as new is as follows:

1. An electric motor having a rotatably oscillating output shaft, said motor comprising a pair of reversing terminals, a reversing switching mechanism for connecting the first of said reversing terminals to an output terminal of a source of electric power while disconnecting the second of said reversing terminals from said output terminal and for connecting the second of said reversing terminals to said output terminal while disconnecting the first of said reversing terminals from said output terminal, a cam on the output shaft for operating said switching mechanism, and abutments limiting the rotation of said output shaft in one direction and in the other, wherein each of said reversing terminals is connected to one of a pair of stationary electrical contacts, said reversing switching mechanism comprises a movable contact operable by said cam into engagement with one of said stationary contacts while being disengaged from the other of said stationary contacts and said movable contact comprises a spring bias detent for maintaining said movable contact and one of said pair of stationary contacts in engagement until disengaged by said cam.

2. The electric motor of claim 1 wherein said movable contact comprises a pivotal generally flat U-shaped member disposed around said shaft and comprising an inner annular surface engageable by said cam for oscillating said member about its pivot, said annular surface having said abutment means to limit the rotation of said cam in one direction and in the other, and a pair of contact surfaces, one on each side of said U-shaped member each for engagement with one of said stationary contacts.

3. The electric motor of claim 2 wherein said U-shaped member has an integral arm portion projecting downwardly from proximate said pivot and being substantially aligned with the axis of symmetry of said member, and said spring bias detent is a compression spring having an end attached to said arm.

* * * * *

UNITED STATES PATENT AND TRADEMARK OFFICE
CERTIFICATE OF CORRECTION

PATENT NO. : 4,315,170

DATED : February 9, 1982

INVENTOR(S) : Silas Penn

It is certified that error appears in the above-identified patent and that said Letters Patent are hereby corrected as shown below:

Col. 2, line 67, change "43" to --42--.

Signed and Sealed this

Twentieth Day of April 1982

|SEAL|

*Attest:*

*Attesting Officer*

GERALD J. MOSSINGHOFF

*Commissioner of Patents and Trademarks*